United States Patent [19]

Roba

[11] 4,419,958

[45] Dec. 13, 1983

[54] NOZZLE FOR COATING OPTICAL FIBERS

[75] Inventor: Giacomo Roba, Cogoleto, Italy

[73] Assignee: Cselt Centro Studi e Laboratori Telecomunicazioni S.p.A., Torino, Italy

[21] Appl. No.: 331,920

[22] Filed: Dec. 17, 1981

[30] Foreign Application Priority Data

Dec. 19, 1980 [IT]  Italy .............................. 68946 A/80

[51] Int. Cl.³ .......................... B05C 3/12; B05C 11/02
[52] U.S. Cl. ........................... 118/405; 118/DIG. 18;
118/125; 425/113
[58] Field of Search ............... 118/405, DIG. 18, 404,
118/125; 65/374.11; 427/356, 357, 358;
425/113, 114

[56] References Cited

U.S. PATENT DOCUMENTS

| | | | |
|---|---|---|---|
| 1,551,751 | 9/1925 | Kozack | 118/125 |
| 2,407,337 | 9/1946 | Kolter | 118/125 |
| 2,980,956 | 4/1961 | Whitehurst et al. | 118/DIG. 18 X |
| 3,574,665 | 4/1971 | Basche | 118/405 X |
| 4,180,622 | 12/1979 | Burkhard et al. | 427/423 |
| 4,260,650 | 4/1981 | Haderer et al. | 427/358 X |

OTHER PUBLICATIONS

*Hackhe's Chemical Dictionary* Fourth edition ©1969, revised and edited by Julius Grant, pp. 31,589 McGraw-Hill.

Primary Examiner—John P. McIntosh
Assistant Examiner—Mary Beth Fennell
Attorney, Agent, or Firm—Karl F. Ross

[57] ABSTRACT

A nozzle used in the coating of optical fibers with a protective resin layer comprises an aluminum body split into two symmetrical halves with cavities which upon assembly form a frustoconical funnel terminating at its narrower lower end in a coaxially converging outlet port. The cavities are machined in solid aluminum blocks whereupon each block is anodized in sulfuric acid to form thereon an abrasion-resistant oxide layer with few, small pores which may be sealed by an after-treatment in hot de-ionized water.

4 Claims, 2 Drawing Figures

NOZZLE FOR COATING OPTICAL FIBERS

FIELD OF THE INVENTION

My present invention relates to a nozzle for the application of a protective resin to an optical fiber used as a light conductor in the telecommunication field.

BACKGROUND OF THE INVENTION

Such fibers, generally consisting of silica glass, are conventionally provided with resin layers designed to protect their surfaces from dust and other abrasive influences that could impair their light-transmitting quality. Thanks to its lower coefficient of elasticity, such a resin layer also serves to absorb breaking stresses which might otherwise rupture the more brittle fiber core.

By the usual treatment method, the fiber is passed in a downward direction through a mass of liquid resin contained in a reservoir which terminates in a converging outlet port. After the fiber emerges from that port, its resin coating is allowed to set by drying or polymerization.

As is well known in the art, the outlet port should have a certain minimum length in order to insure a laminar flow of the resin, thereby providing a uniform and continuous coating. The thickness of that coating depends, of course, on the outlet diameter which generally ranges between about 150 and 300$\mu$. Resins with a high coefficient of elasticity should be applied in a thin layer of up to 5$\mu$ whereas those of lower coefficients may have thicknesses ranging between 20 and 40$\mu$. The convergence of the outlet port is designed to counteract radial force components, resulting from the viscosity and the flow velocity of the resin, which tend to interfere with the concentricity of the coating; the usual vertex angle ranges between 2° and 8°.

A nozzle forming both the reservoir and the outlet duct can be made integral or can be split into two symmetrical halves clamped together. In the first instance, the fiber to be coated must be introduced into the nozzle bore before being placed under traction so that its diameter may not have reached its final size; this could cause a blocking of the outlet and a rupture of the fiber. With a two-part nozzle, on the other hand, its halves can be closed around the fiber after the drawing operation has been started.

In either case, the relatively narrow outlet port of the nozzle experiences considerable wear during use, especially in the initial phase when the reservoir does not yet contain any resin; even thereafter, such wear may result from fiber vibrations which are only incompletely damped by the surrounding resin flow. In order to maintain the coating diameter within prescribed tolerance limits, the nozzle must therefore be frequently replaced unless it consists of a highly abrasion-resistant material such as ruby, corundum or tungsten carbide, for example. These materials, however, are very difficult to machine with the precision necessary to produce a very smooth guide surface for the exiting fiber, especially when the nozzle body is split into two parts.

OBJECT OF THE INVENTION

Thus, the object of my present invention is to provide an improved nozzle for the resin coating of optical fibers which combines the advantages of long wear and easy machining.

SUMMARY OF THE INVENTION

I have found, surprisingly, that a nozzle satisfying these desiderata is obtained if its body, which has a through-going passage forming a frustoconical funnel terminating at its smaller end in a converging outlet port coaxial therewith, is made of aluminum and is provided at least on the wall surface of its outlet port with an alumina layer of limited porosity.

To facilitate the insertion of a fiber under traction into its passage, the nozzle body is preferably split into two parts with mutually complementary cavities defining its passage. Such a nozzle can be conveniently produced by closely juxtaposing two aluminum blocks with flat surfaces contacting each other and then jointly machining these blocks to form the funnel and outlet port centered on an axis which lies in their plane of contact. Each block is thereafter anodized to form an oxide layer unitary with its aluminum body on at least the surface of its outlet port.

While that oxide layer is almost as hard and abrasion resistant as corundum, it rests on a relatively soft substrate of metallic aluminum and could therefore be rather easily removed by impact. This, however, is not a drawback for its intended use since the stresses involved in the fiber-drawing process are quite moderate, on the order of $10^{-2}$ kg. No appreciable forces are exerted by the resin since the same is not under pressure.

BRIEF DESCRIPTION OF THE DRAWING

The above and other features of my invention will now be described in detail with reference to the accompanying drawing in which.

SPECIFIC DESCRIPTION

Figure 1:
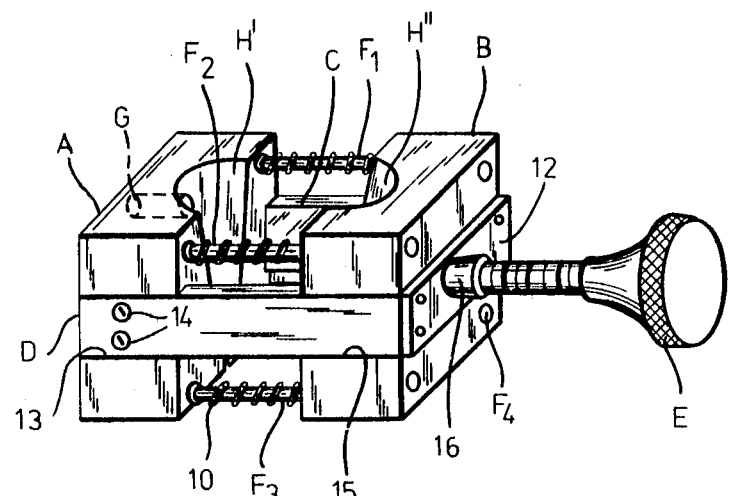
FIG. 1 is a perspective view of a nozzle embodying my invention.
Figure 2:
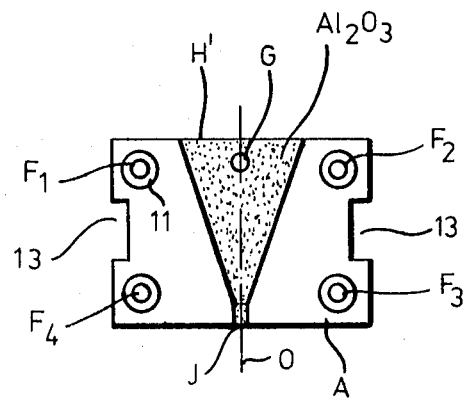
FIG. 2 is an elevational view of one half of the nozzle shown in FIG. 1.

As shown in the drawing, a nozzle according to my invention comprises two aluminum blocks A and B which are mutually symmetrical about a contact plane including a vertical axis O. Two frustoconical cavities H', H" of blocks A and B define a downwardly converging funnel in line with an outlet port J converging at a small vertex angle, preferably within the aforementioned range of 2° to 8°. The two blocks are slidably interconnected by a set of four guide rods $F_1$–$F_4$ surrounded by respective coil springs 10 that are partly received in recesses 11 formed in the confronting block faces. A yoke 12 has a pair of legs C, D whose extremities are received in lateral notches 13 of block A, to which they are secured by screws 14, and which engage in similar notches 15 of block B for further guidance of the latter. A screw E is threaded into a neck 16 of yoke 12 and has a captive end (not shown) retained in block B so that its rotation in one sense causes the blocks to approach each other against the resistance of springs 10. An inlet port G in block A serves for the introduction of liquid resin into the funnel H', H" and its maintenance at a constant level while a nonillustrated optical fiber moves down along the axis O of its passage in order to be coated with that resin.

The cavities defining this passage are machined while the blocks A and B are in their contacting position in which the springs 10 are fully withdrawn into recesses 11. The blocks are then separated and immersed in an anodizing bath to be provided with a layer of alumina which ought to cover at least the surface portions defining the outlet port J. That layer can, of course, also extend into the cavities H' and H"; it will generally be most convenient to immerse the entire block in the bath.

Chromic or sulfuric acid could be used as the electrolyte. Chromic acid yields a thinner layer than sulfuric acid, with few but relatively large pores. I therefore prefer the use of sulfuric acid which gives good results with a voltage of about 30 V; it should be borne in mind that pore size and number varies inversely with the applied voltage. The aluminum block should already be connected to voltage on being immersed into the electrolyte whose temperature is to be thermostatically controlled and which should be continuously stirred to remove gas bubbles from the electrode surfaces. Current density should also be monitored and maintained as constant as possible by minor adjustments of voltage and/or temperature.

The thickness of the oxide layer depends, of course, on the duration of the treatment which also affects the porosity of the outermost stratum of that layer. The following range of parameters will be suitable in most instances:

| electrolyte | $H_2SO_4$ |
|---|---|
| concentration | 12 to 20% by weight |
| bath temperature | $-5°$ to $+5°$ C. |
| voltage | 20 to 40V |
| current density | 12 to 16 mA/cm$^2$ |
| duration of treatment | 20 to 30 minutes |

In order to prevent the adsorption of impurities, the pores of the alumina layer may then be sealed by immersion of the workpiece, still under voltage, in hot de-ionized water with a pH of about 6 to 6.5 for approximately a quarter hour.

I claim:

1. A nozzle for applying a protective resin coating to optical fibers, comprising a body essentially consisting of aluminum with a throughgoing passage which forms a frustoconical funnel terminating at its smaller end in a converging outlet port coaxial therewith, at least the wall surface of said outlet port being provided with an alumina layer unitary with said body and substantially free from open pores.

2. A nozzle as defined in claim 1 wherein said body is split into two parts with mutually complementary cavities defining said passage, said parts having a contact surface including the axis of said passage.

3. A nozzle as defined in claim 2 wherein said nozzle further comprises spring means tending to separate said parts and clamping means holding said parts together against the force of said spring means.

4. A nozzle as defined in claim 1, 2 or 3 wherein said outlet port converges at a vertex angle ranging between substantially 2° and 8°.

* * * * *